United States Patent [19]

Cahill

[11] 4,129,318
[45] Dec. 12, 1978

[54] BICYCLE CARRY AID

[76] Inventor: Charles A. Cahill, 567 Commonwealth Ave., Newton Center, Mass. 02159

[21] Appl. No.: 802,044

[22] Filed: May 31, 1977

[51] Int. Cl.² ............................................. B62J 39/00
[52] U.S. Cl. .................................. 280/289 A; 224/5 P
[58] Field of Search ............... 180/175, 289 G, 289 E, 180/289 A, 289 L, 289 R; 224/30 R, 31, 5 P

[56] References Cited

U.S. PATENT DOCUMENTS

| | | | |
|---|---|---|---|
| 2,506,685 | 5/1950 | Sadloski | 224/5 P X |
| 3,806,157 | 4/1974 | Yarnall | 280/289 G |
| 4,037,765 | 7/1977 | Slayman | 224/5 P X |

FOREIGN PATENT DOCUMENTS

| | | | |
|---|---|---|---|
| 802910 | 2/1951 | Fed. Rep. of Germany | 280/289 L |
| 381744 | 1/1908 | France | 280/289 G |
| 965290 | 9/1950 | France | 280/289 G |
| 59028 | 4/1954 | France | 280/275 |
| 262047 | 1/1929 | Italy | 280/289 L |
| 6782 of | 1901 | United Kingdom | 224/30 R |

Primary Examiner—Joseph F. Peters, Jr.
Assistant Examiner—Terrance L. Siemens

[57] ABSTRACT

A cushioning device adapted to fit and attach in the corner between the seat tube and the top tubular member of a bicycle frame and having a contoured under portion adapted to rest on the shoulder of a person carrying the bicycle.

7 Claims, 14 Drawing Figures

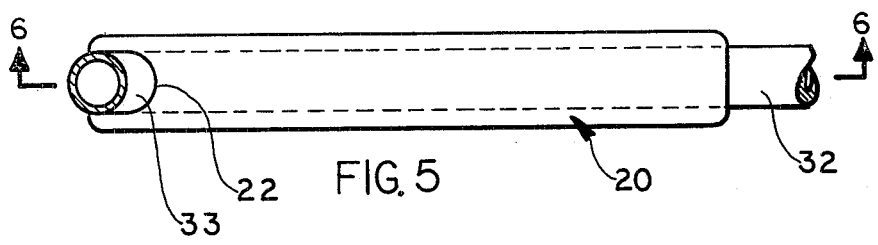
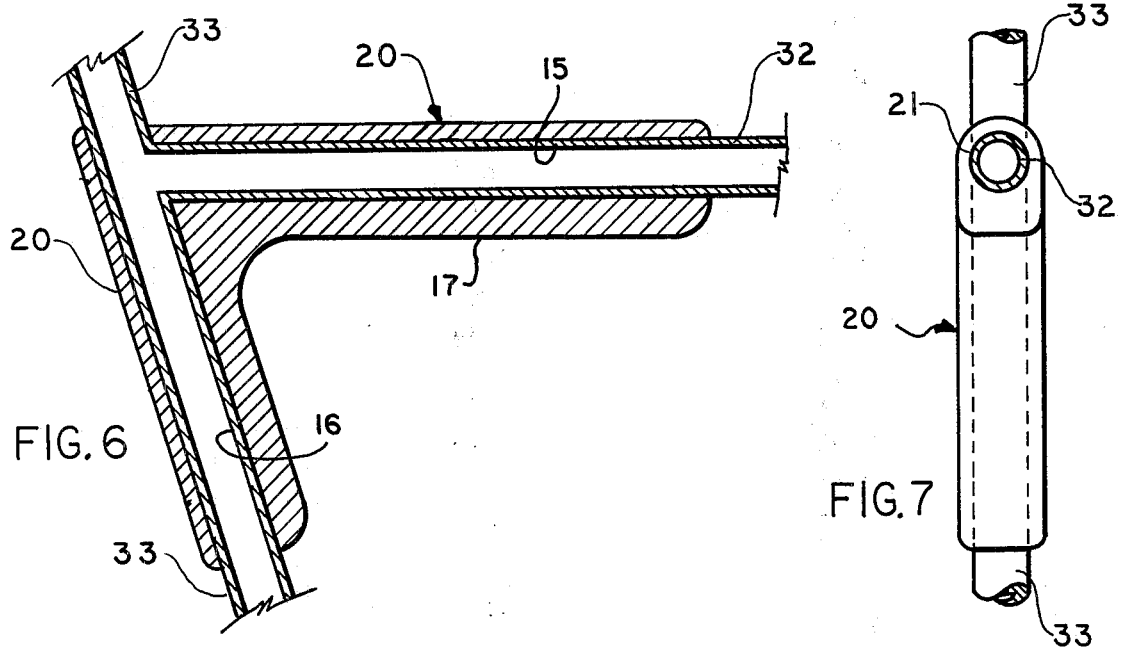

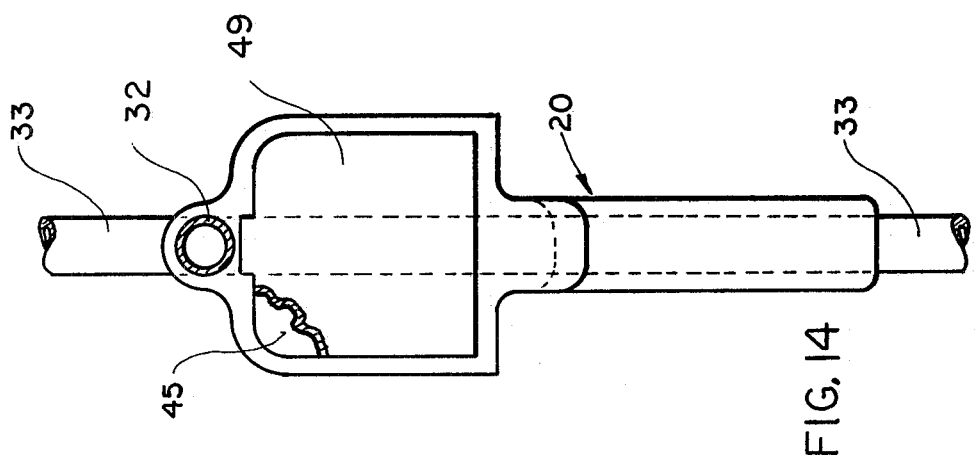
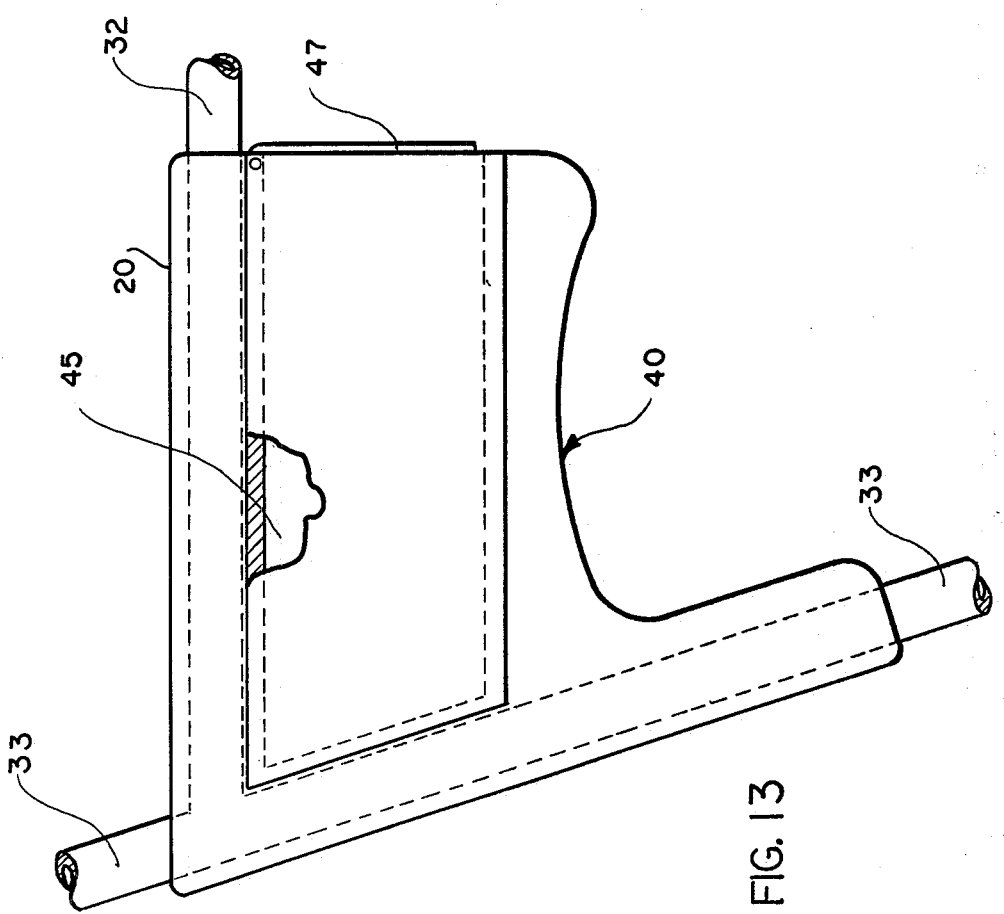

BICYCLE CARRY AID

BACKGROUND OF THE INVENTION

Shoulder pads and cushions for carrying heavy articles such as ice, coal, furniture and the like are well known to the art. The main object of this invention is to provide a comfortable aid for carrying a bicycle on the shoulder which is removably mounted on the frame at the juncture between its top tube and the seat tube.

SUMMARY OF THE INVENTION

According to one embodiment of my invention, the aid is preferably formed of a generally three-sided cushion of resilient material that is removably disposed in the corner between the top tube and seat tube of a bicycle frame and held in place by channels on two sides which engage these tubes. The third side of the aid is contoured and extends under the frame so that it can rest on the shoulder of a person carrying the bicycle and preferably is of a yoke-like shape. In another embodiment of the invention, the device is molded to the top tube and seat tube as a permanent part of the bicycle frame. As modification of these embodiments, carrying compartments can be arranged or being part of said device to hold a wide variety of supplies.

BRIEF DESCRIPTION OF THE DRAWINGS

FIG. 5 is a top plan view of another embodiment of the invention in which the aid is molded around portions of the frame.

FIG. 6 is a cross-sectional view, taken on line 6-6 of FIG. 5.

FIG. 7 is a front elevational view of the embodiment shown in FIGS. 5 and 6.

FIG. 13 is a side elevational view, partially in cross-section of another embodiment of the invention in which a storage compartment is located below the top tube of the bicycle.

FIG. 14 is a front elevational view, partially in cross-section, of the embodiment shown in FIG. 13.

DETAILED DESCRIPTION OF THE INVENTION

Figure 1:
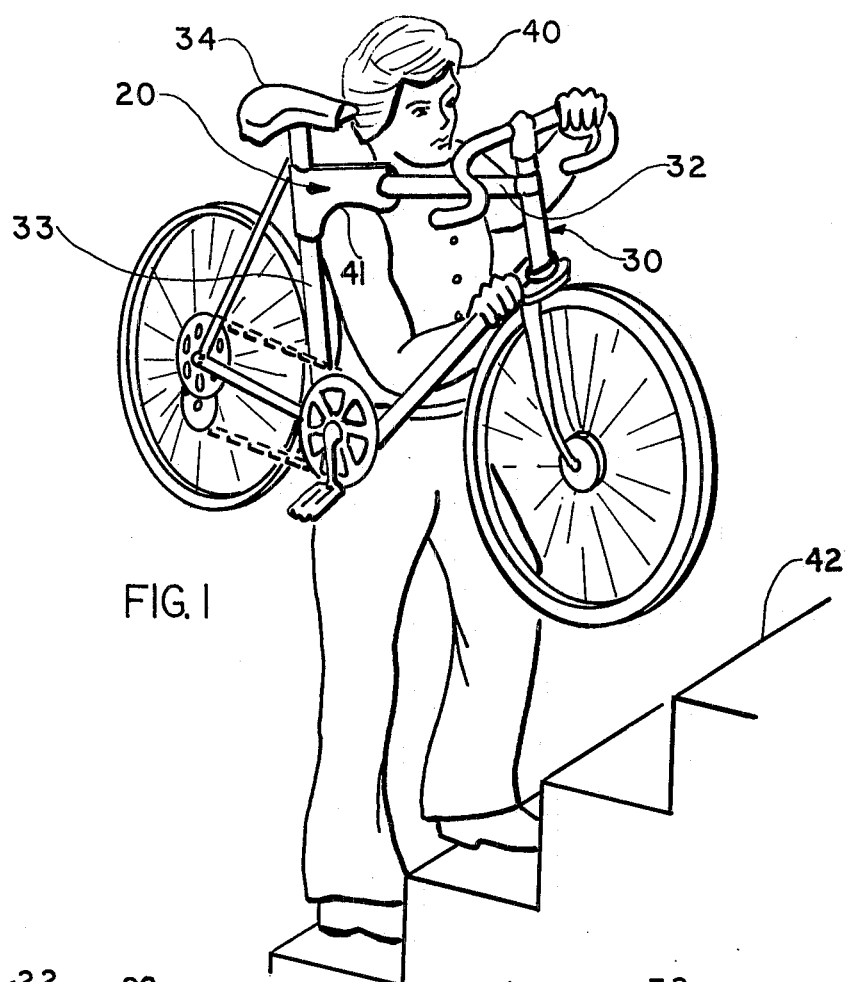
FIG. 1 is a perspective view of a person carrying a bicycle up a flight of stairs with the carry aid resting on his shoulder.

Referring to the drawings, a person 40 as shown in FIG. 1 is shown carrying a bicycle 30 up a flight of stairs 42. The bicycle frame includes a top tubular member 32 and a seat tube 33 that join at a corner under the seat 34 which is the approximate balance point of the bicycle 30. The bicycle carrying aid 20, formed of natural or synthetic rubber, plastic, wood or other suitable material, is disposed in the corner and is arranged to be placed on the shoulder with the contoured portion 41 resting thereon.

Figure 2:
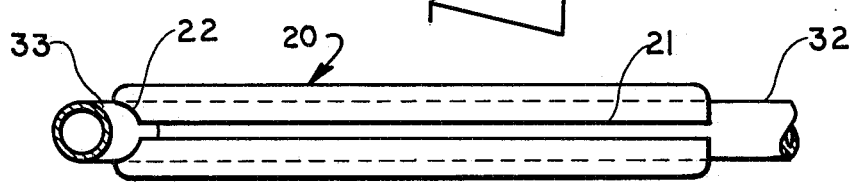
FIG. 2 is a top view of one embodiment of the invention.
Figure 3:
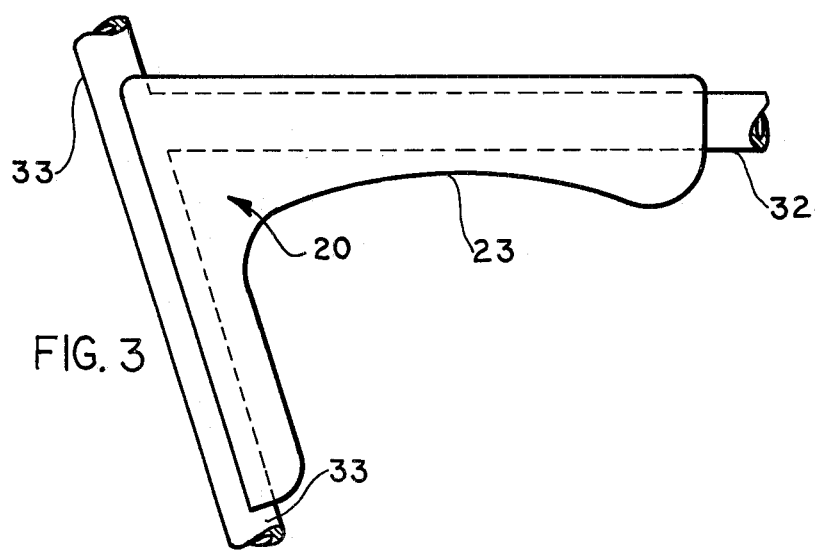
FIG. 3 is a side elevational view of the aid shown in FIG. 2.
Figure 4:
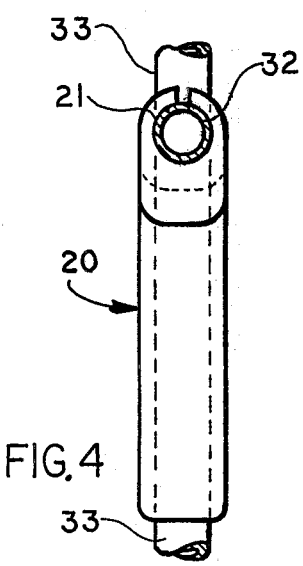
FIG. 4 is a front elevational view of the aid shown in FIG. 2.

As shown in FIGS. 2 to 4, the aid 20 has a longitudinally opening channel 21 adapted to spread apart and then return to the original shape when fitted around the top tube 32. A second channel 22 is angularly arranged with reference to the first channel 20 and adapted to fit on the seat tube 33 adjacent the corner formed by top tube 32 and seat tube 33. The bicycle carry aid 20 is further shaped with a yoke 23 under the channel 21 and in front of the channel 22 and can be rounded so that it will rest comfortably on the shoulder of the person carrying the bicycle. As an alternative construction, the bicycle carry aid 20 can be hollow inside so it may be inflated or deflated, if desired.

As shown in FIGS. 5 to 7, the aid 20 can be joined as a permanent fixture on the bicycle frame in which each is molded around the top tubular member 32 to form the longitudinally extending channel 15 and also around the seat tube 32 as to form vertical channel 16. The two channels will meet at the intersection of the seat tube 33 and the top tubular member 32 and form the cushion 17 which is disposed at the juncture.

Figure 8:
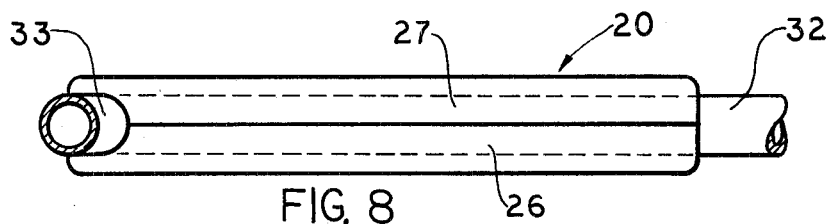
FIG. 8 is a top plan view of another embodiment of the invention in which the aid is formed in two mating halves and attached together by bolts.
Figure 9:
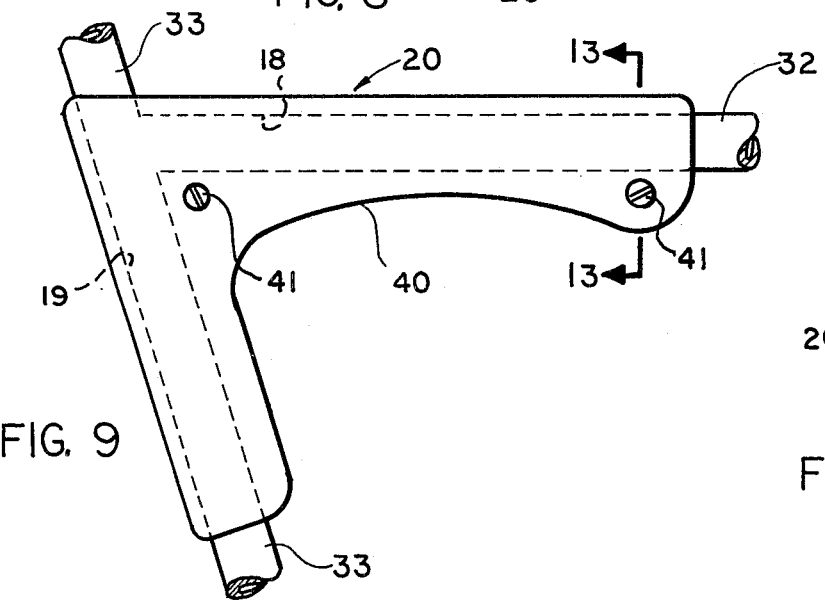
FIG. 9 is a side elevational view of the aid shown in FIG. 8.
Figure 10:
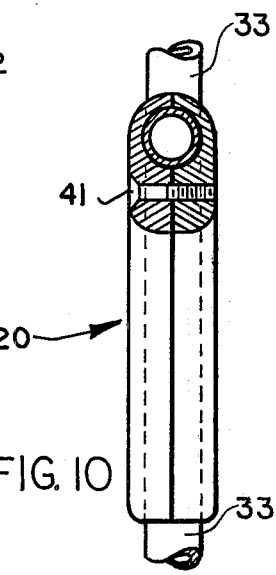
FIG. 10 is a front elevational view, partially in cross-section, taken on line 13—13 of FIG. 9.

The bicycle carry aid 20 can be constructed as separate parts 26 and 27 as shown in FIGS. 8 to 10. In this embodiment, the aid is shaped in two mating halves which, when joined together, preferably surround the seat tube 33 and top tubular member 32 with channels 19 and 18 respectively. The two halves are joined together with bolts 41 or other suitable fastening means such as adhesive fasteners or straps. The cushion 40 again is disposed at the juncture between the top tubular member 32 and the seat tube 33 to form a comfortable rest for carrying the bicycle.

Figure 11:
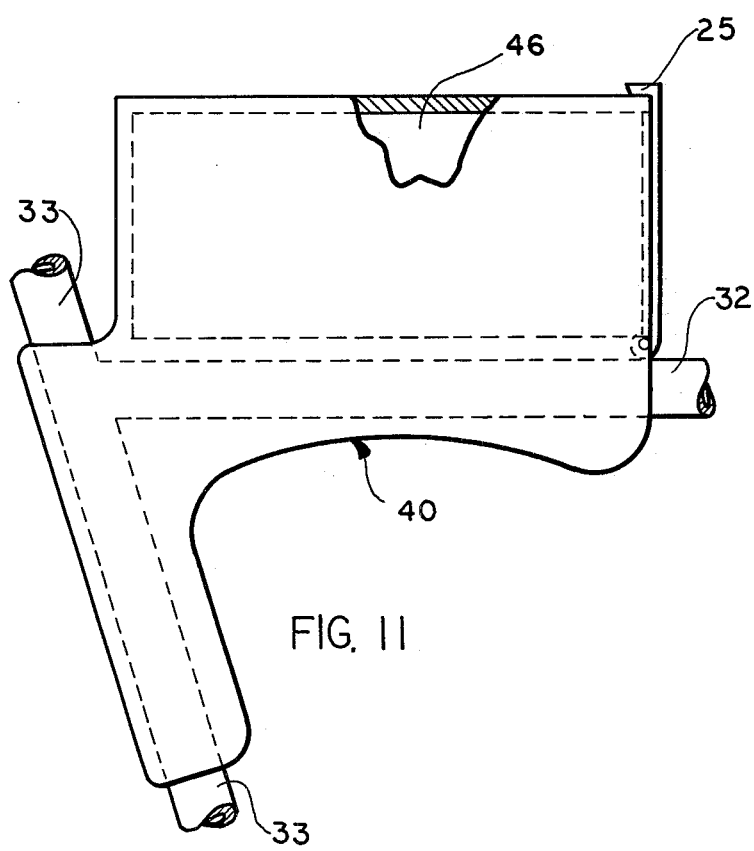
FIG. 11 is a side elevational view, partially in cross-section, of the aid equipped with a storage compartment above the horizontal tube.
Figure 12:
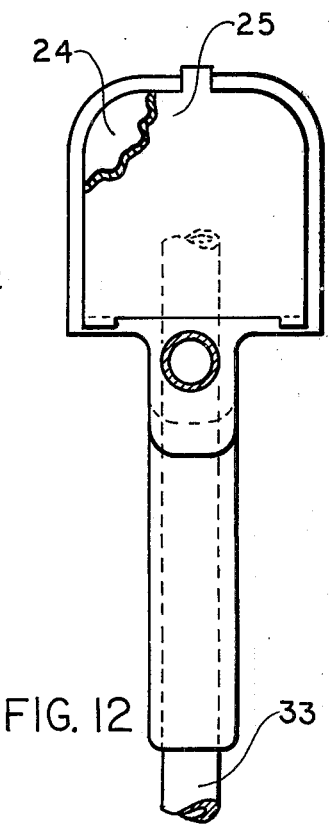
FIG. 12 is an elevational view, partially in cross-section, of the front of the aid shown in FIG. 11.

Further modifications of the invention as shown in FIGS. 11 to 14 involve constructing the bicycle carry aid 20 with a storage compartment 46, having a door or cover 25 to allow for the storage of first aid equipment, bicycle repair equipment, tools, rain gear, ground cloth, air pump, fishing gear, or any other personal items. In the embodiment of FIGS. 11 and 12, compartment 46 is mounted above the tubular member 32 while in a similar embodiment as shown in FIGS. 13 and 14, the storage compartment 45 is disposed below the tubular member 32 and has a door or cover 47 located at the end of container 45.

It is apparent that modifications and changes can be made within the spirit and scope of the present invention. It is my intention, however, only to be limited by the scope of the appended claims.

I claim:

1. A carry aid for a bicycle which has a frame including a top tubular member and an adjoining seat tube, said aid comprising;

a cushion of resilient material adapted to be mounted upon the frame in the corner between the top tubular member and the seat tube, said cushion including on the outside thereof a first channel extending within said cushion and along the length thereof and arranged to engage said top tubular member and also on the outside thereof, a second channel extending within said cushion along the length thereof and angularly arranged with reference to said first channel, said cushion further including a yoke on its inside, shaped so as to enable a person to carry the bicycle on the shoulder.

2. The bicycle carry aid according to claim 1 wherein said first channel is formed of a cylindrical cavity having a horizontally extending slot formed so as to allow the sides to spread apart and detachably engage said top tubular member.

3. The bicycle carry aid according to claim 1 wherein said first and second channels are each formed of cylindrical cavities, disposed so as to enclose at least the major portion of each of said top tubular member and said seat tube.

4. The bicycle carry aid according to claim 1 wherein the aid is formed in a pair of matching halves, adapted to engage each other and engage said tubular members.

5. The bicycle carry aid according to claim 1 wherein both of said channel members are substantially cylindrical in shape and are adapted to surround both said top tubular member and said seat tube.

6. The bicycle carry aid according to claim 1 further including a storage compartment disposed over said first channel.

7. The bicycle carry aid according to claim 1 further including a storage compartment disposed between said first channel and said yoke.

* * * * *